June 15, 1965 H. F. RIETH 3,188,688
METHOD AND APPARATUS FOR MAKING AN ELECTRICAL RESISTOR
Filed June 24, 1960 6 Sheets-Sheet 1
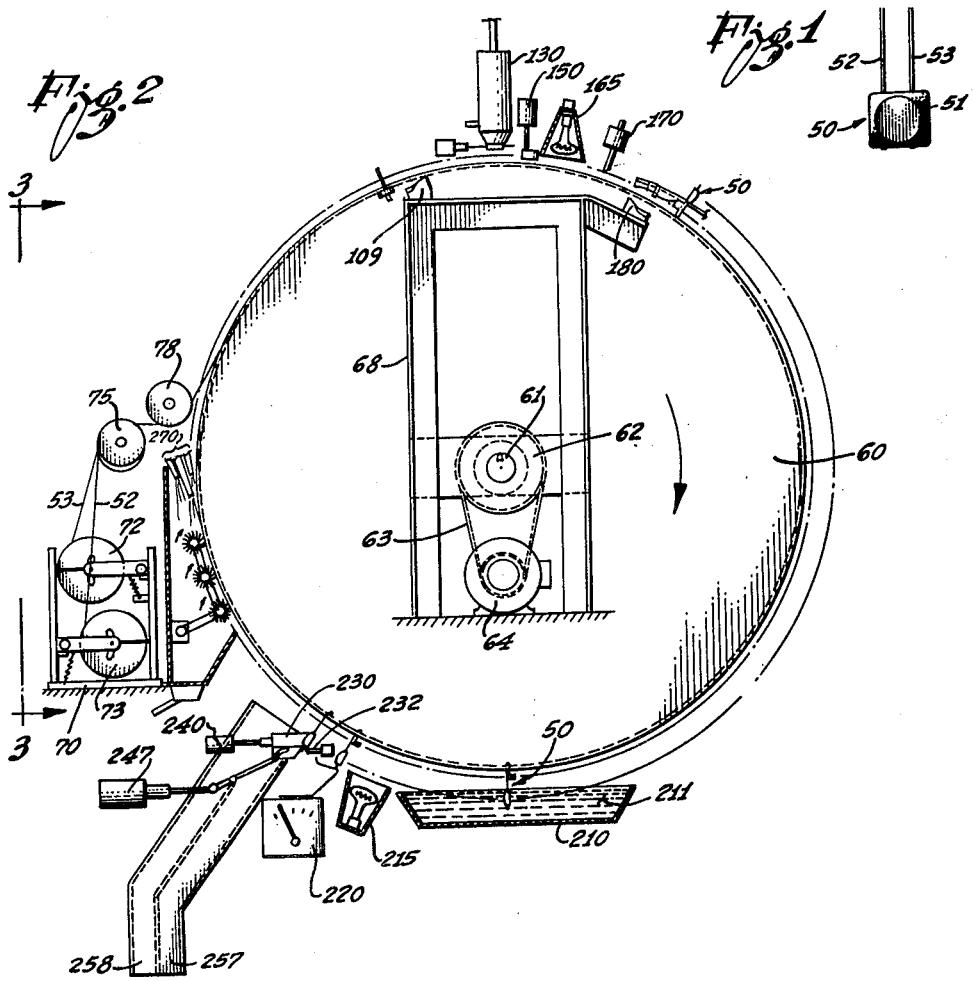
INVENTOR:
Harold F. Rieth

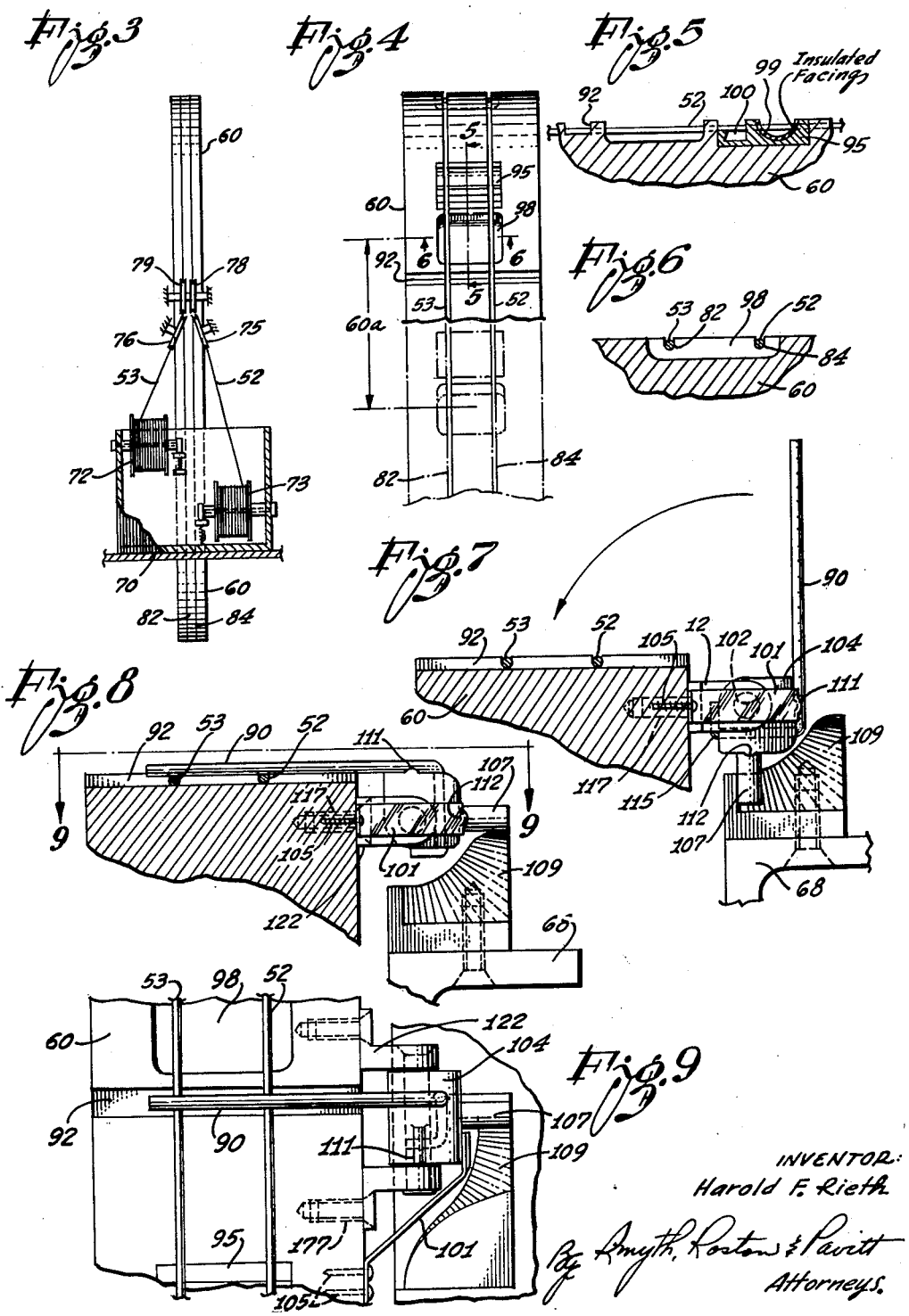

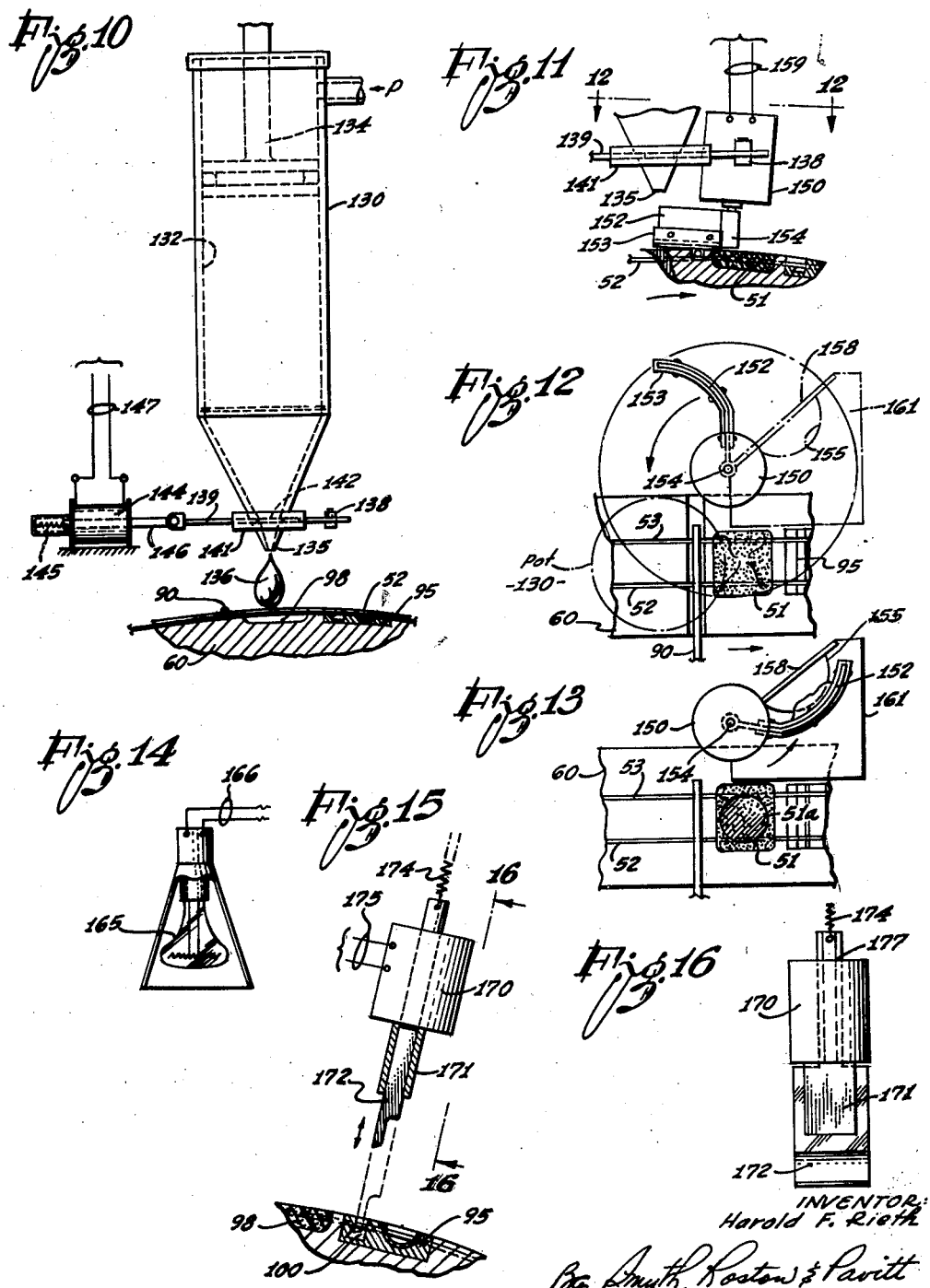

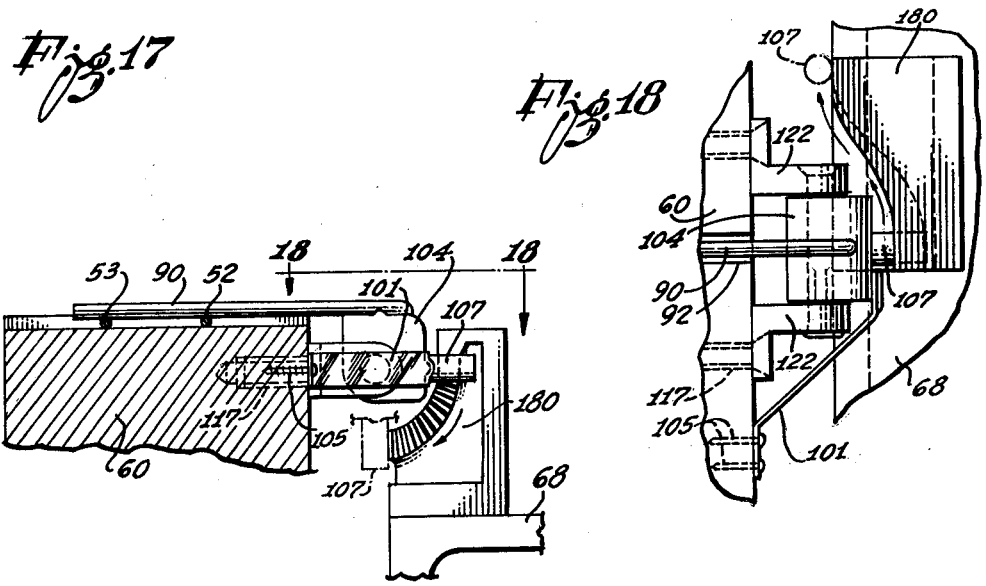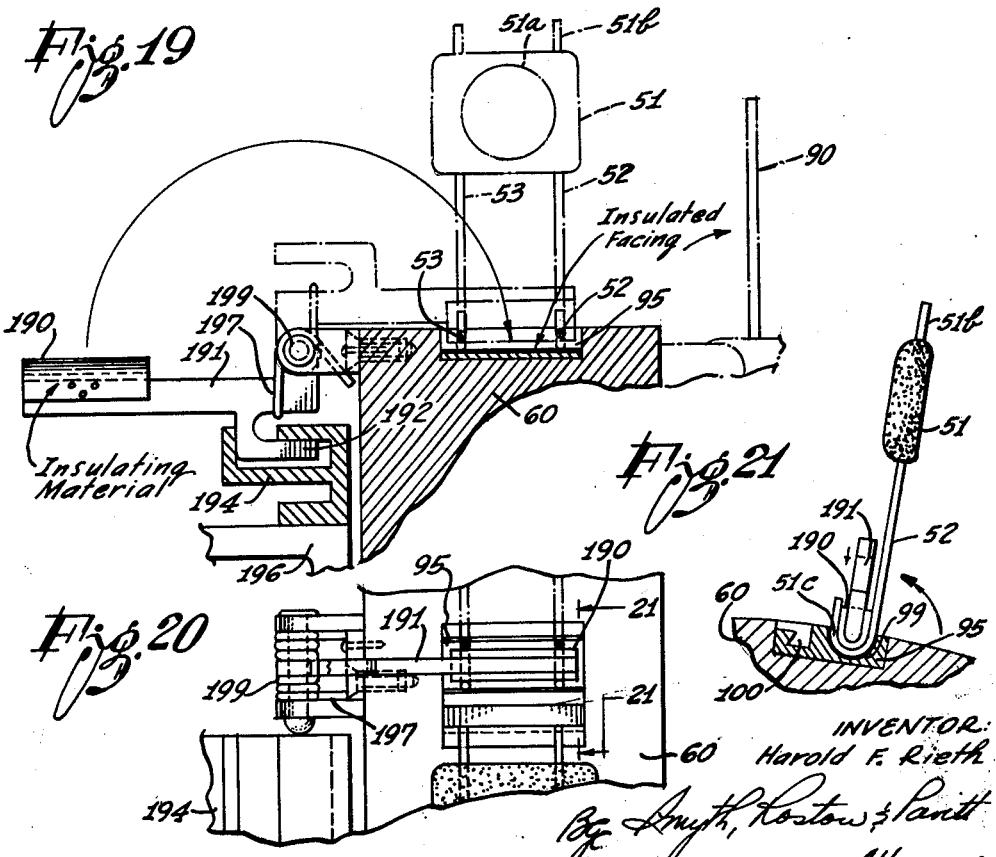

June 15, 1965   H. F. RIETH   3,188,688
METHOD AND APPARATUS FOR MAKING AN ELECTRICAL RESISTOR
Filed June 24, 1960   6 Sheets-Sheet 5
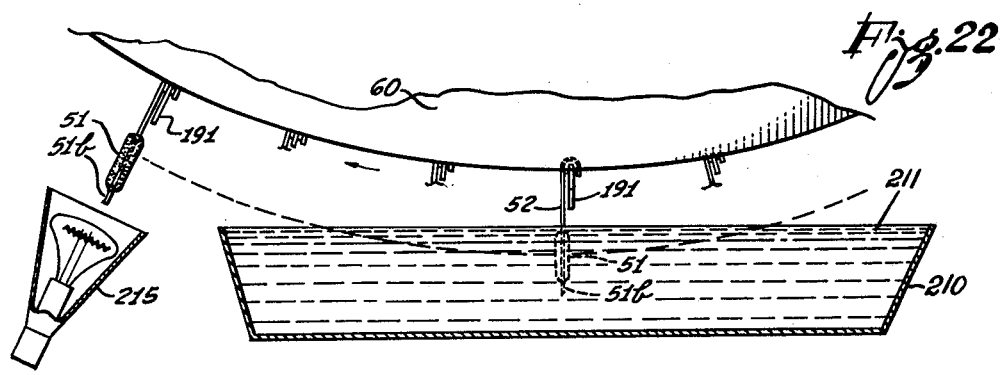
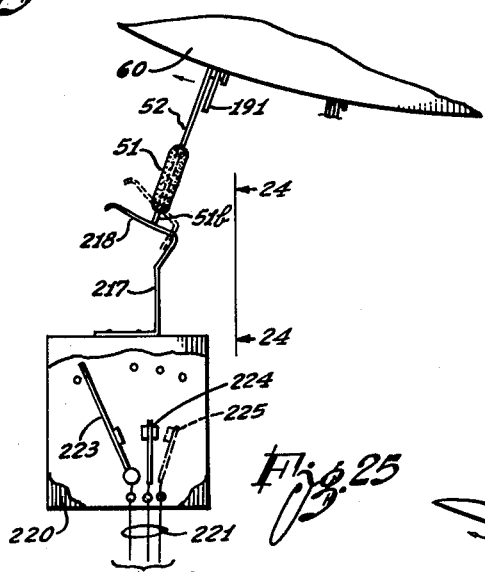
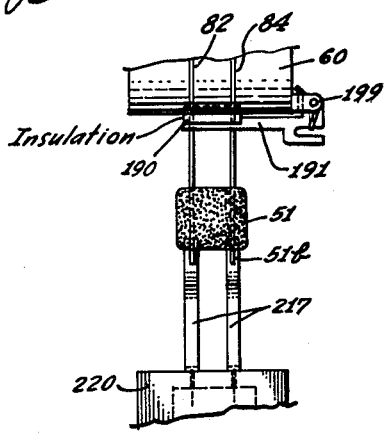
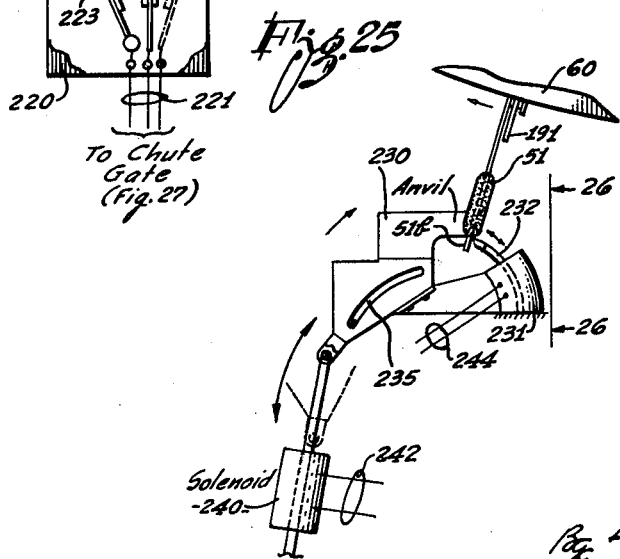
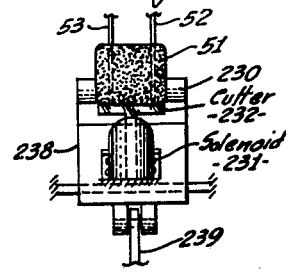
INVENTOR:
Harold F. Rieth
Attorneys

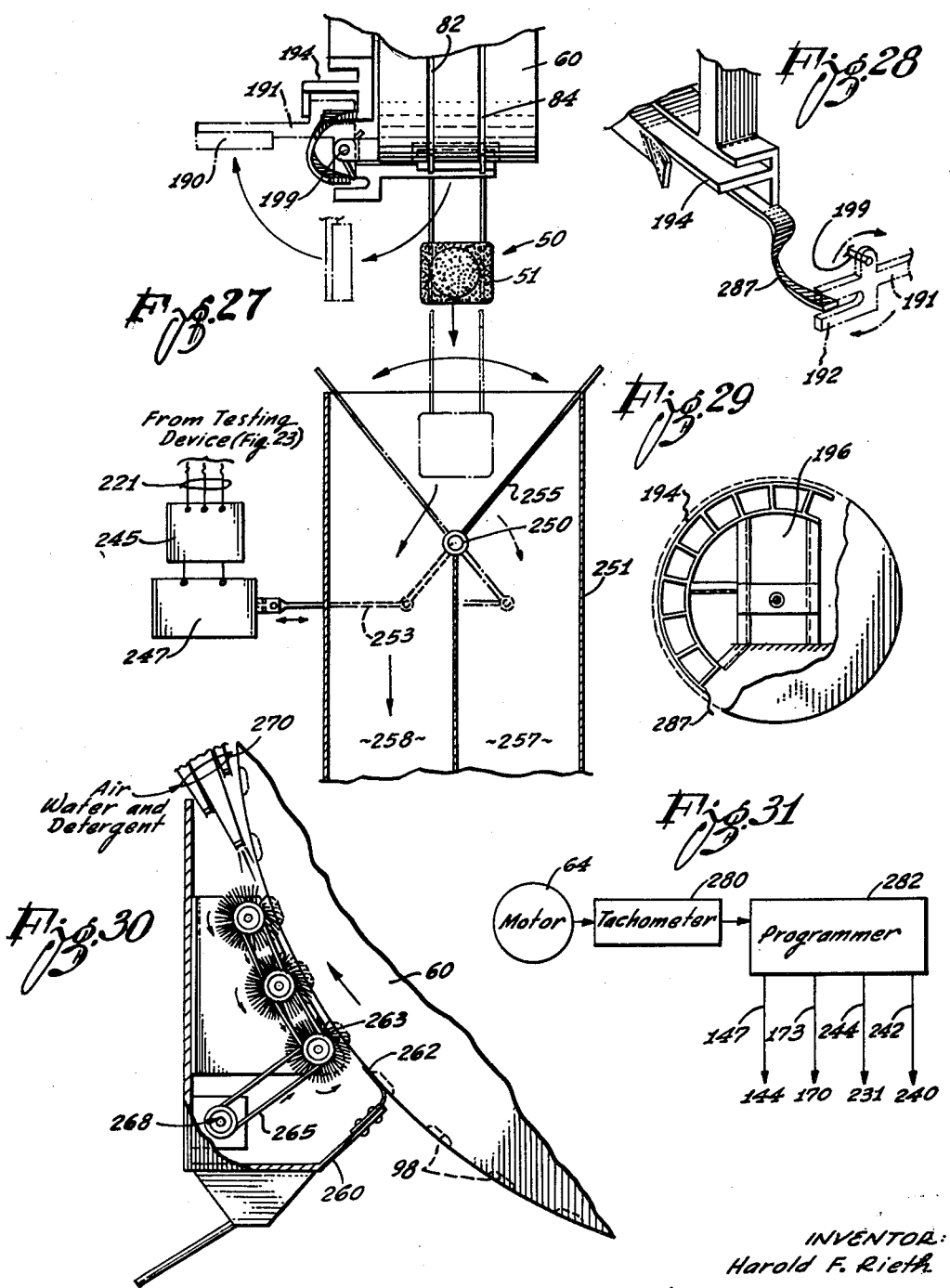

United States Patent Office 3,188,688
Patented June 15, 1965

3,188,688
METHOD AND APPARATUS FOR MAKING AN ELECTRICAL RESISTOR
Harold F. Rieth, Pasadena, Calif., assignor to Packard-Bell Electronics Corporation, Los Angeles, Calif., a corporation of California
Filed June 24, 1960, Ser. No. 38,639
8 Claims. (Cl. 18—5)

This invention relates to electrical resistors and, more particularly, to a method and apparatus for making electrical resistors.

Resistors utilized in electrical circuitry are commonly divided into wire-wound and composition types according to whether the resistance element is metallic or is a conducting compound. The most common type of composition resistor is the carbon resistor made by combining powdered carbon or graphite with a synthetic resin bond and an inert material. The composition is molded to a desired shape with wires being disposed at opposite ends of the molded shape.

There are a number of disadvantages in the prior methods of making small composition resistors. For example, the molding method is complex, expensive and relatively slow. Moreover, the resistor is fabricated in a stepped as opposed to continuous procedure. Further, composition resistors are not particularly suited for mounting on printed boards because the leads of each resistor extends from its opposite ends instead of from the same side. It is desirable, of course, to extend the leads in parallel from the same side of the resistor in order to facilitate its mounting on a flat surface, and to minimize the required mounting space. However, for small resistors it is quite difficult to provide for the two leads extending from the same resistor side.

In a specific illustrative embodiment of this invention, a method and apparatus are provided for manufacturing small composition resistors on a high speed continuous basis. Though the resistors may be quite small, the two terminals of each resistor extend from one of its sides so that the resistor is particularly suited for printed circuit applications.

The apparatus includes a continuously rotating wheel about which are positioned various automatically operating equipment for the different steps of the resistor fabrication. The wheel includes two peripheral grooves into which parallel wires are laid at the starting point of the wheel cycle for automatically fabricating the resistors. The wires are utilized to form the two terminal leads of each resistor. The wires are continuously placed in the peripheral grooves of the wheel as the wheel rotates. Automatic holding means maintains the wires in position on the peripheral surface of the wheel.

In addition to the two continuous grooves about the periphery of the wheel, the periphery also includes a number of spaced anvils and a number of depressions or molds alternately positioned with the anvils about the periphery of the wheel. The two wires pass over the successive anvils and through the successive depressions. As the wheel rotates, a predetermined amount of conductive composition in plastic form is deposited in each depression to cover the two wires. As the depression is rotated away from the composition dispenser, it passes adjacent a cutter which cuts the two wires at one side of the depression. The composition in the depression thereupon passes adjacent a heater which solidifies the conductive composition. The solidified composition in the depression is thereafter rotated adjacent a second cutter which cuts the wires on the other side of the composition against the anvil. As the wires are cut, and before the solidified composition can lift from the wheel, a forming tool bends the two wires in a depression in the anvil. The solidified conductive composition or bead on the two wires is lifted from the depression by the operation of the forming tool to extend substantially radially from the wheel. The bead on the two wires is held in the radial position until the end of the cycle fabricating.

The radially extended bead is thereupon rotated through a container of insulating material which encloses the bead and the two small wire extensions. The insulated resistor is then rotated adjacent another heating lamp to a testing device which both removes the insulating material covering the two small wire extensions and which measures the resistance through the bead. The testing device controls sorting means in accordance with the measured resistance of the bead or formed resistor. After being tested, the small wire extensions are cut and then the forming tool is removed to allow the resistor to fall into the sorting means. Thereafter, the depressions on the periphery of the wheel are passed through automatic cleaning equipment back to the starting point of the wheel cycle.

Further advantages and features of this invention will become apparent upon consideration of the following description when read in conjunction with the drawing wherein:

FIGURE 1 is a top view of a composition resistor formed by the method and apparatus of this invention;

FIGURE 2 is a somewhat schematic side view of the apparatus of the present invention illustrating the various steps in the automatic sequence for fabricating the resistors;

FIGURE 3 is an end view taken along lines 3—3 of FIGURE 2 illustrating the arrangement of the spools for feeding the two wires onto the periphery of the main wheel;

FIGURE 4 is a top view of the main wheel utilized in the apparatus of this invention illustrating the anvil forming blocks and the molding depressions on the periphery of the main wheel;

FIGURE 5 is a partial sectional view taken along lines 5—5 of FIGURE 4 illustrating the anvil forming blocks and molding depressions of the main wheel;

FIGURE 6 is a sectional view taken along lines 6—6 in FIGURE 4 illustrating the position of the wires relative to the molding depression on the periphery of the main wheel;

FIGURE 7 is a side view of the holding down equipment in its released position and partially mounted on the side of the main wheel and partially mounted on a stationary bracket adjacent the main wheel;

FIGURE 8 is a side view of the holding down equipment in its hold down position and partially mounted on the side of the main wheel and partially mounted on a stationary bracket adjacent the main wheel;

FIGURE 9 is a top view of the main wheel and hold down equipment with the hold down equipment being in its hold down position;

FIGURE 10 is a side view of the conductive composition dispensing apparatus positioned adjacent the main wheel of the apparatus of this invention;

FIGURE 11 is a side view of the scraping equipment utilized to smooth the surface of the dispensed conductive composition;

FIGURE 12 is a top view of the scraping equipment taken along lines 12—12 of FIGURE 11 and illustrating its relationship with respect to the periphery of the main wheel;

FIGURE 13 is a partial top view of the scraping equipment in position for dropping the excessive material into a disposal opening;

FIGURE 14 is a partially sectionalized side view of a heating lamp positioned adjacent the periphery of the main wheel;

FIGURE 15 is a partially sectionalized side view of a cutter for the wires on the periphery of the main wheel;

FIGURE 16 is a front view taken along lines 16—16 of FIGURE 15 illustrating the cutter;

FIGURE 17 is a partially sectionalized side view of the hold down equipment and release mechanism for said equipment;

FIGURE 18 is a partial top view taken along lines 18—18 of FIGURE 17 for illustrating the camming release mechanism for the hold down equipment;

FIGURE 19 is a partially sectionalized side view of the bead erecting mechanism illustrating its normal and its operated positions;

FIGURE 20 is a top view of the bead erecting equipment and a portion of the main wheel;

FIGURE 21 is a sectional view taken along lines 21—21 of FIGURE 20 illustrating the position of the bead erecting mechanism with the bead extending radially from the main wheel;

FIGURE 22 is a partially sectionalized side view of an insulator bath for the radially extended beads on the main wheel of the apparatus of this invention;

FIGURE 23 is a side view of the electrical testing equipment of this invention;

FIGURE 24 is a front view of a position of the testing equipment taken along lines 24—24 of FIGURE 23;

FIGURE 25 is a side view of cutting equipment for removing the small terminal wires from the formed resistor;

FIGURE 26 is a front view taken along lines 26—26 of FIGURE 25 illustrating the cutting equipment;

FIGURE 27 is a partially sectionalized side view of the output equipment of this invention;

FIGURE 28 is a pictorial view of the retaining ring mounted on the main wheel and utilized in cooperation with the resistor erecting equipment;

FIGURE 29 is a side view of the retaining ring which is utilized in cooperation with the bead erecting equipment;

FIGURE 30 is a partially sectionalized side view of the equipment utilized to clean the mold depressions on the periphery of the main wheel; and FIGURE 31 is a functional representation of the synchronizing equipment utilized in the apparatus of the present invention.

Referring first to FIGURE 1, a resistor 50 is depicted having a body 51 and two wires or terminals 52 and 53 extending from the same side of the body 51. As is hereinafter described, the body, which may be coated with an insulating material, may be made of a composition including carbon black and a silicon resin. The wires 52 and 53 may be made of any conductive material such as copper or aluminum. Though not clearly illustrated in FIGURE 1, the ends of the wires 52 and 53 are curved. The apparatus of this invention illustrated in FIGURES 2 through 31, inclusive, is utilized to automatically and continuously fabricate resistors 50 at a relatively high speed.

The entire sequence or cycle for fabricating the resistors 50 is functionally represented in FIGURE 2. Referring to FIGURE 2, a main wheel 60 is rotated in a clockwise direction about a shaft 61 and serves a number of functions including the function of conveying the input material successively through the different fabrication steps or positions of the cycle of fabricating the resistors 50. The wheel 60 may be relatively large, illustratively, having a diameter of five feet and a longitudinal or axial dimension of a few inches. The wheel 60 is driven by a motor 64 which is coupled by a belt 60 and pulley 62 to the shaft 61 of the wheel 60.

As illustrated in FIGURE 31, the motor 64 also drives a tachometer 280. The tachometer 280 is a device for providing a signal in accordance with the instantaneous speed of the motor 64. The output of the tachometer 280 is introduced to a programmer or counting arrangement 282 which has a number of output leads 147, 175, 244 and 242, all of which are hereinafter described in detail. These leads are coupled to electrical responsive equipment positioned about the periphery of the main wheel 60. The programmer 282, which is driven by the tachometer signal, functions to energize its various output leads during predetermined portions of the fabrication cycle.

The speed of the wheel 60 about the shaft 61 may be illustratively at 1 revolution per minute, and the periphery of the wheel 60 is divided into a number of equal segments, illustratively, fifty. Each of these segments is utilized for making a resistor 50 during the rotation of the wheel 60. Accordingly, during each rotation of the wheel 60, fifty resistors 50 are fabricated. The equipment positioned about the periphery of the wheel 60 is operated in a cycle which is repeated fifty times during each revolution of the wheel 60. As indicated above, the speed of the wheel 60 may illustratively be 1 revolution per minute so that the various equipment positioned about the periphery of the wheel 60 are operated in cycles which are repeated fifty times a minute.

The starting point for the fabrication cycle and the method of manufacturing the resistors 50 is at the left of the main wheel 60 in FIGURE 2. Two spools 72 and 73, which are spring loaded, provide for two continuous wires 52 and 53. As shown in FIGURE 3, the wires 52 and 53 from the spools 73 and 72 pass over respectively associated pulleys 75 and 78, and 76 and 79. The spools 72 and 73 are supported on a bracket 70 which is stationary with respect to the wheel 60. The wires 52 and 53 are provided in parallel from the pulleys 78 and 79 respectively to the periphery of the main wheel 60.

FIGURE 4 is a top view of a portion of the periphery of the main wheel 60. Two grooves 84 and 82 extend circumferentially around the periphery of the wheel 60. The wires 52 and 53 are laid respectively in the grooves 84 and 82 in the periphery of the main wheel 60. As the wheel 60 rotates in a clockwise direction (FIGURE 2) the two wires 52 and 53 are continuously pulled by the wheel 60 from the spools 73 and 72. The wires 52 and 53 are continuously fed in this manner to the wheel 60 due to holding or wire gripping members 90, which are illustrated particularly in FIGURES 7 through 9 and hereinafter described in detail.

There are fifty holding members positioned about the periphery of the wheel 60. Each increment or position 60a (FIGURE 4) of the wheel 60 includes a member 90 and also an anvil 95, a groove 92 which cooperates with the member 90, and a mold depression or dish 98. The two grooves 84 and 82 pass through these components of each of the positions 60a.

As depicted in FIGURES 7-9, the members 90 are supported on one side of the wheel 60 adjacent the transverse indentations or slots 92 across the periphery of the wheel 60. When a member 90 is in its latching or gripping position, illustrated in FIGURES 8 and 9, the two wires 52 and 53 are held firmly in the slot 92 against the periphery of the wheel 60. As the wheel 60 rotates, the successive members 90 are moved to their gripping positions so that accordingly, the spools 73 and 72 continue to feed out the continuous wires 52 and 53.

The members 90 are successively operated as the wheel 60 rotates by a stationary cam 109 which is positioned adjacent the side of the rotating wheel 60 on a bracket 68. An actuating pin 107 is engaged by the surface of the cam 109, to rotate a body member 104 about a shaft 102 in a clockwise direction as illustrated in FIGURE 7. The member 90 fits through the body 104 and has a flange 115 bent around the opposite side of the body 104. The gripping member 90 is, accordingly, rigidly supported on the body 104. The body 104 has two nodes 111 and 112 against which a flat spring 101 bears. The spring 101, as shown particularly in FIGURE 9, is attached by means of fasteners 105 to the side of the main wheel 60. Two brackets 122 are attached by screws 117 to the same side of the main wheel 60. The brackets 122 support the body 104 and the member 90. The flat spring 101 has an indentation, not shown, toward one end for engaging one or the other of the two nodes 111 or 112 of the body 104. The nodes 111 and 112 are positioned on two sides of the body 104 which are perpendicular to each other. Accordingly, under the influence of the cam 109, the pin 107 is rotated in a clockwise direction so that the body 104 is snapped about in a 90 degree arc. The member 90 mounted on the body 104 is accordingly rotated against the wires 52 and 53 into the groove 92 on the periphery of the wheel 60.

As shown in FIGURES 4, 5 and 6, the two wires 52 and 53 pass through the grooves 84 and 82 on the periphery of the wheel 60 and over the forming or mold depression 98 and the anvil 95 briefly mentioned above. Each of the fifty sections 60a about the periphery of the wheel 60 include one mold depression 98 and one anvil 95. As the wheel 60 rotates adjacent the stationary cam 109, the successive holding members 90 are rotated against the wires 52 and 53.

The wires 52 and 53 which are held down by the members 90, thereupon are rotated on the wheel 60 adjacent a composition dispenser 130 illustrated in FIGURE 2 and, more particularly, in FIGURE 10. The dispenser 130 is effectively a relatively large piston having a piston member 134 for exerting pressure against the plastic composition 132 in the dispenser 130. The dispenser 130 has an opening 135 at its lower end from which a predetermined amount of the composition is dispensed as each mold depression 98 passes under the opening 135.

The composition in the dispenser 130 may include carbon black as the conductive material and a silicon resin as the filler and the binder. The carbon black may illustratively be of 20 to 50 milli-microns diameter with the sulfur impurities removed by calcining. The silicon resin may be of the type designated 996 and manufactured by the Dow Corning Manufacturing Company. By weight, the composition may include 26 parts of the resin and one part of the carbon black. The mixture of carbon black and silicon resin is first ball-milled for a relatively long time, illustratively, 72 hours to fully intersperse the materials and to reduce the particle size. The silicon resin is a high temperature material which becomes hard when baked or heated. The ball-milled mixture in the dispenser 130 is quite plastic so that it can be forced through the small opening 135 (FIGURE 10) at the bottom of the dispenser 130.

As shown in FIGURE 10, the dispenser 130 includes a cutting member 139 which is uitilized to separate a predetermined amount of the mixture which thereupon falls into the mold depression 98 beneath the dispenser 130 on the wheel 60. The knife 139 is operated by a solenoid 144 having a winding which is energized over a pair of leads 147 from the programmer 282 in FIGURE 31. The programmer 282 energizes the solenoid 144 so as to deposit a bead of the composition mixture just as the depression 98 is directly opposite the opening 135 of the dispenser 130.

The core 146 of the solenoid 144 is resiliently restrained by a spring 145 so that when the solenoid 144 is de-energized, the core 146 and the knife 139 therewith are returned to the left in FIGURE 10. An adjustable stop 138 is provided on the end of the knife 139 to limit the motion of the knife 139 in a sleeve 141 toward the left. The knife 139 is a relatively flat member having an opening 142 for passing the composition mixture to the opening 135 at the bottom of the dispenser 130. When the solenoid 144 is operated, the hole 142 is moved to the left so that the knife 139 cuts the composition mixture. The resulting globule or bead of mixture falls into and fills the depression 98, and covers the two wires 52 and 53. FIGURE 6 illustrates that due to the grooves 82 and 84, the two wires 52 and 53 pass through the depression 98 instead of over it. The bead of mixture deposited in the depression 98, accordingly, covers the two wires 52 and 53. As the wheel 60 rotates, the successive depressions 98 are in this manner filled with beads of the conductive material.

As illustrated in FIGURE 2, the depression 98 loaded with composition pass from dispenser 120 to the dispenser 130, it then passes adjacent a scraper motor 150. The motor 150, illustrated in FIGURES 11 through 13, is continuously energized through leads 159 to rotate a scraper 152 at a relatively high speed over the periphery of the wheel 60 passing adjacent thereto. The scraper 152 has a rubber end 153 which catches the excess of the composition in the depression 98 and carries it therewith as illustrated in FIGURES 12 and 13 to a disposal opening 155 in a disposing member 161. The scrapings are caught in the arcuate shape of the scraper 152 as it rotates on the motor shaft 154 and are carried to the opening 155. A stationary bar 158 along the edge of the opening 155 cleans the bottom of the scraper 152 as it rotates over it. FIGURE 13 illustrates that the scraped area 51a of the bead or body 51 may be circular. After being scraped, the bead 51 in the depression 98 is passed adjacent a heater 165 which may be energized over leads 166. The heater 165, which is illustrated in FIGURES 2 and 14, causes the bead 51 to harden.

After hardening, a knife or cutting blade 172, driven by solenoid 170, illustrated in FIGURES 15 and 16 as well as FIGURE 2, cuts the two wires 52 and 53 on one side of the body 51. The blade 172 is moved by the solenoid 170 into a cutting depression 100 of the anvil 95 associated with the depression 98. As indicated above, each of the fifty sections 60a (FIGURE 4) on the periphery of the wheel 60 includes an anvil 95, the mold depression 98 and the groove 92. The solenoid 170 is energized over a pair of leads 175 from the programmer 282 as illustrated in FIGURES 31 and 15. The programmer 282 times the energization of the solenoid 170 so that the blade 172 cuts the two wires 52 and 53 approximately 0.25 inch from the bead 51. The two short remaining extensions from the bead 51 are designated 51b in FIGURES 19, 21, 23 and 24. Returning to FIGURES 15 and 16, the blade 172 is maintained in alignment by a pair of plates 171 which are mounted on the solenoid 170. The core 177 of the solenoid 170 is resiliently retained by a spring 174 so that when the solenoid 170 is de-energized, the blade 172 is returned to its upper position away from the anvil 95. Though the wires 52 and 53 have been cut on one side of the bead 51, the bead 51 is retained on the periphery of the wheel 60 by the holding or gripping member 90 described above.

After passing, however, from the wire cutting position, the member 90 is lifted from the wires 52 and 53 and a wire forming member 190, shown in FIGURES 19 through 21, is rotated against the two wires 52 and 53 extending from the side of the body 51. As illustrated in FIGURE 19, the holding member 90 is supported on one side of the main wheel 60 whereas, the wire forming member 190 is supported on the other side of the wheel 60. The member or arm 90 is released by a cam 180 depicted in FIGURES 17 and 18. The cam 180 effectively reverses the camming operation of the cam 109 described above in reference to FIGURES 7 through 9.

The camming pin 107 described above in reference to FIGURES 7 through 9 and also shown in FIGURES 17 and 18 is rotated by the cam 180 in a clockwise direction in FIGURE 17 to lift the arm 90 from the periphery of the wheel 60. The two wires 52 and 53 are, accordingly, released by the cam 180. As the arm 90 is rotated in a clockwise direction, the wire forming member 190 is also being rotated in a clockwise direction so that it engages the wires 52 and 53 just after the arm 90 releases them.

The member 190 is made of electrically insulating material so as not to establish an electrical connection between the two wires 52 and 53. An insulating support is desired because as is hereinafter described, the member 190 continues to contact the two wires 52 and 53 when the resistor is electrically tested. The member 190 is mounted on an arm 191 which is in turn pivotally mounted on the side of the wheel 60. The arm 191 is rotatably mounted on a shaft 199 and resiliently urged by a spring 197, also on the shaft 199, in a clockwise direction. The arm 191, however, is retained extending away from the wheel 60 as shown in FIGURE 19 by a retaining ring 194 which is mounted by a bracket 196 adjacent the side of the wheel 60. The retaining ring 194 is illustrated particularly in FIGURES 28 and 29. A flange 192 in FIGURE 19, of the arm 191 is engaged in the retaining ring 194 to maintain the arm 191 in its retained position extending from the main wheel 60. The retaining ring 194 is stationary with respect to the wheel 60 and the arm 191 mounted on the wheel 60. Actually, there are fifty arms 191 mounted on the wheel 60, one for each of the fifty sections 60a. The flanges 192 slide in the retaining ring 194 as the wheel 60 rotates.

At the position of the wheel 60 opposite the cam 180 where the arm 90 is reset, an opening is provided at the top of the retaining ring 194 so that the arm 191 is released at that position. The arm 191, urged by the spring 197, rotates through a 180 degree arc to force the member 190 against the wires 52 and 53, just after they have been released by the arm 90. The wires at this position are over a depression 99 in the anvil 95. As illustrated particularly in FIGURE 21, the member 190 forces the wires 52 and 53 into the arcuate depression 99 forcing it into a 180 degree curve and raising the bead 51 of the resistor 50 to extend radially from the wheel 60. In other words, the wire forming member 190 provides the double function of engaging the wires 52 and 53 to support the wires 52 and 53 on the periphery of the wheel 60 and it also lifts the bead 51 to extend perpendicularly from the peripheral surface. The bead 51 is retained in this radially extended position as the wheel 60 rotates and until the process is completed.

As shown in FIGURE 2 and particularly in FIGURE 22, the extended bead 51 is rotated on the wheel 60 into a solution 211 of insulating material in a container 210. The bead 51 is fully immersed in the insulator solution 211 which may illustratively be a solution of "Durez." As described above, when the wires 52 and 53 are cut by the blade 172, small portions or extensions 51b thereof extend from the bead 51. The distance of the extension is determined by the spacing between the anvil 95 and the depression 98 on the periphery of the wheel 60. These extensions 51b are also covered with the insulating material. The coated resistor 50 is rotated on the wheel 60 from the container 210 adjacent another heater 215 which hardens the insulator material. Though illustrated as a lamp 215 in FIGURE 22, the heating means may be in the form of an oven which straddles the periphery of the wheel 60 so that the resistors 50 move through the oven as the wheel 60 rotates.

After the insulating material is hardened, the formed resistor is tested utilizing the extensions 51b which still extend from the body 51. As illustrated in FIGURES 23 and 24, the extensions 51b move across a flange 218 of a resilient conductive member 217. The members 217 are effectively test prongs for a meter testing apparatus 22a. The insulating material covering the tips of the wire extensions 51b is rubbed off so that electrical contact is provided between them and the flanges 218. The tips of the extensions 51b rub against a substantial portion of the flanges 218 to insure that the insulator material is wiped off the ends of the wire extensions 51b. The initial portion of the flanges 218 may be rough to facilitate the rubbing effect.

When electrical contact is provided, current through the test prongs 217 and the bead or body 51 of the resistor 50 is utilized to determine the resistance provided thereby. As described above, the member 190, which holds the wires 52 and 53 against the anvil 95, is made of insulating material so as not to establish a low impedance connection between the ends of the wires 52 and 53. Similarly, the anvil 95 is made from an insulating material such as a very high temperature plastic.

The electrical current through the meter apparatus 220 determines the rotation of an armature 223. The armature 223 engages a contact 224 for resistances below a predetermined value. For very low resistances, the armature 223 engages the contact 224 and forces the contact 224 against another contact 225. If the armature 223 does not engage the contact 224, it indicates a reject condition and if both contacts 224 and 225 are in contact with the armature 223, it also indicates a reject condition. Only for resistance values in a predetermined range such that the armature 223 contacts only the armature 224 is the resistor 50 being tested considered satisfactory. The leads 221 from the armature 223 and contacts 224 and 225 are coupled to a control device 245 in FIGURE 27 which provides an output pulse only when the armature 223 contacts the contact 224 alone.

As illustrated in FIGURE 29, a solenoid 247 is operated by the control device 245 to position a slide 255 pivoted on a shaft 252. An arm 253, which is moved by the solenoid 247, rotates the slide 255 so that the resistor 50, when dropped, falls into the one or the other of the two chutes 257 and 258 of the output apparatus 250. Before passing to the output apparatus 250, the resistor 50 leaves the testing meter apparatus 220 and passes to cutting means including an anvil 230 and a solenoid 231 shown in FIGURES 25 and 26. The solenoid 231 is energized by the programmer 282 just after a solenoid 240 is energized thereby. The solenoid 240 which is energized from the leads 242 from the programmer 282 moves a member 238 in a clockwise direction. The member 238 supports the anvil 230 against which the slowly moved body 51 abuts. When the body 51 engages the anvil 230, the solenoid 231 is operated to rotate a blade 232 and cut off the extensions 51b of the two wires 52 and 53. The solenoids 240 and 231 are only briefly energized so that they return to their normal position immediately thereafter.

The resistor 50 continues moving from the cutting apparatus until it is over the output apparatus 250. At that position, as illustrated in FIGURE 28, the arm 191 is engaged by an arcuate extension 287 of the retaining ring 194 described above. The flange 192 of the arm 191 is on the lower side of the arcuate extension 287 so that the arm 191 is rotated in a clockwise direction in FIGURE 28 to return the arm 191 back to a position where the flange 192 enters the retaining ring 194. The direction of rotation in FIGURE 28 is opposite to that illustrated in FIGURE 19 because FIGURE 19 shows the arm 191 on top of the wheel 60, whereas, FIGURE 28 shows the position of the arm 191 at the bottom of the wheel 60. When the arm 191 is rotated away from the wires 52 and 53, the resistor 50 is released and falls into the output apparatus 250.

After the resistor 50 is dropped into the output apparatus 250, the mold depressions 98 are cleaned by passing them first adjacent a scraper 262 supported on a stationary bracket 260 and then adjacent a number of rotating brushes 263. The brushes 263 are driven by a pulley arrangement including a pulley 265 from a motor 268. Air, water and detergent are supplied from a number of nozzles 270 to the rotating brushes 263. The cleansed mold depressions 98 are then rotated on the wheel 60 back to the starting position of the fabrication cycle.

The wheel 60 rotates in a continuous manner with a resistor 50 being formed at each of its fifty sections 60a as it rotates. During one rotation of the wheel 60, accordingly, fifty resistors 50 are provided to the output 250. The timing of the cycle of the wheel 60 is merely illustrative, as it is readily apparent that the wheel 60 can be moved either faster or slower. The programmer 282 timing is automatically adjusted in accordance with the wheel speed by the tachometer 280 (FIGURE 31). Further, some of the steps in the method can be reversed. For example, instead of first insulating the resistor 50 and then testing it, the testing can be done before the insulation.

The resistors 50, as deposited in the output chutes, have both leads 52 and 53 extending from the same side of the body 51. Though the resistors 50 are quite small, there is no danger of the two leads 52 and 53 contacting each other in the body 51.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. Apparatus for producing composition type resistors, including, a rotatable wheel having a peripheral surface and defining a plurality of spaced depressions in said peripheral surface, means mechanically coupled to said wheel for rotating said wheel, means positioned adjacent the peripheral surface of the rotating wheel for extending two spaced wires through the spaced depressions in the peripheral surface, means synchronized with said rotating means and positioned adjacent the peripheral surface of said rotating means for depositing a particular amount of a plastic resistive composition into each of the depressions to enclose a portion of each of the two spaced wires and to establish an electrical resistive connection therebetween, means positioned adjacent the peripheral surface of said wheel and synchronized with said rotating means for cutting the two spaced wires between each pair of depressions in the peripheral surface, means positioned adjacent the peripheral surface of said wheel and synchronized with said rotating means for aligning and supporting the pieces of wires cut by said cutting means to extend radially with respect to said rotatable wheel, and an insulator tank positioned adjacent the peripheral surface of said wheel in the path of portions of the radially aligned pieces of wires whereby the deposited composition enclosing the radially aligned pieces is coated with insulating material.

2. Apparatus for producing composition type resistors in accordance with claim 1, including, in addition, testing means positioned adjacent the peripheral surface of said wheel for successively testing the resistances of the composition between each pair of radially aligned pieces of wires, said testing means including contact means for electrically contacting the two pieces of wires associated with the successively deposited compositions.

3. Apparatus for producing composition type resistors in accordance with claim 2 wherein said aligning and supporting means includes an insulator member for maintaining the pieces of wire in radial alignment with respect to said rotatable wheel.

4. Apparatus for producing composition type resistors from a pair of parallel wires made of an electrically conductive material, including, transport means for moving said wires along a particular path, mold means on the transport means carried along the particular path, said mold means defining a plurality of depressions and including means for maintaining the wires therein, a first work station positioned along the particular path, said work station being constructed and arranged to flow a predetermined quantity of an electrically conductive plastic composition into the depressions and around the wires while the composition is in a fluid state, a second work station positioned along the particular path for hardening the successive quantities of the composition into solid beads that encase at least portions of the wires, a third work station positioned along the particular path for cutting the moving wires between each pair of successively deposited beads, and a fourth work station positioned along the particular path for successively coating the hardened beads with an insulating material.

5. Apparatus for producing composition type resistors from a pair of parallel wires made of an electrically conductive material, including, means defining a plurality of spaced depressions, means for moving said wires along a particular path through the spaced depressions, means positioned along the particular path for successively depositing plastic beads of an electrically conductive composition in the depressions in enveloping relationship to the pair of spaced wires, means positioned along the particular path for heating the successively deposited beads to harden them, means positioned along the particular path for cutting the moving wires between each two successively deposited beads, means positioned along the particular path for successively coating the hardened beads with an insulating material, and testing apparatus positioned along the particular path for successively measuring the resistance through the coated beads and including contact means for successively electrically contacting the two pieces of wire associated with each bead.

6. Apparatus for producing composition type resistors, including, a wheel having a peripheral surface and defining a depression and a pair of peripheral grooves communicating with the depression, means for feeding a first wire into one of the peripheral grooves and through the depression and for feeding a second wire into the other peripheral groove and through the depression, means positioned adjacent the peripheral surface of the wheel for depositing a bead of a plastic, electrically resistive composition in the depression to engage a segment of both of said first and second wires, and means positioned adjacent the peripheral surface of the wheel for separating the segments of the wire and the bead thereon and for determining the electrical resistivity between the first and second wires upon the deposit of the bead of plastic conductive composition in the depression.

7. The combination set forth in claim 6 wherein means are disposed adjacent the peripheral surface of the wheel for adding electrical insulation to the surface of the bead of plastic, electrically resistive composition upon the deposit of the bead in the depression.

8. Apparatus for producing composition resistors, including, a rotatable wheel having a plurality of peripheral sections, each of said sections defining a mold depression and two grooves communicating with the depression, means for rotating said wheel, means positioned adjacent the periphery of the wheel for continuously introducing a wire into each groove and into the mold depression of each section, supply means for supplying a plastic resistive composition in a fluid state, means positioned adjacent the periphery of the wheel for successively flowing quantities of the fluid plastic resistive composition into the mold depressions of the sections of the wheel whereby the quantities will harden into rigid beads and form a resistive connection between the two wires in that section, means positioned adjacent the periphery of the wheel for successively removing the wires and composition from the sections of the wheel and cutting the wires between the beads, and means positioned adjacent the periphery of the wheel for separating the beads and the segment of the wires therein from the continuous wires and testing the resistivity of the wires and the composition in each section of the wheel upon the introduction of the plastic resistive composition into each mold depression.

References Cited by the Examiner
UNITED STATES PATENTS

| | | | |
|---|---|---|---|
| 2,368,389 | 1/45 | Von Knauf | 29—33.51 |
| 2,600,694 | 6/52 | Sakirsky | 29—33.51 |
| 2,664,486 | 12/53 | Colpitts | 29—155.63 |
| 2,787,567 | 4/57 | Fisher | 18—21 X |
| 2,933,804 | 4/60 | Math | 29—155.63 |

WHITMORE A. WILTZ, *Primary Examiner.*

JOHN F. CAMPBELL, *Examiner.*